(12) United States Patent
Noh

(10) Patent No.: US 8,336,864 B2
(45) Date of Patent: Dec. 25, 2012

(54) LONGITUDINAL CANTED COIL SPRING CONTACTS TO FACILITATE ASSEMBLY

(75) Inventor: Shawn Noh, Garden Grove, CA (US)

(73) Assignee: Bal Seal Engineering, Inc., Foothill Ranch, CA (US)

( * ) Notice: Subject to any disclaimer, the term of this patent is extended or adjusted under 35 U.S.C. 154(b) by 147 days.

(21) Appl. No.: 12/887,247

(22) Filed: Sep. 21, 2010

(65) Prior Publication Data

US 2011/0068523 A1 Mar. 24, 2011

Related U.S. Application Data

(60) Provisional application No. 61/244,403, filed on Sep. 21, 2009.

(51) Int. Cl.
*F16F 1/06* (2006.01)
(52) U.S. Cl. ........................................................ 267/167
(58) Field of Classification Search ........... 267/166–169
See application file for complete search history.

(56) References Cited

U.S. PATENT DOCUMENTS

| | | | | |
|---|---|---|---|---|
| 2,515,629 | A * | 7/1950 | Chambers, Jr. | 267/167 |
| 3,336,942 | A * | 8/1967 | Keith et al. | 137/529 |
| 4,826,144 | A * | 5/1989 | Balsells | 267/167 |
| 4,907,788 | A * | 3/1990 | Balsells | 267/167 |
| 5,108,078 | A * | 4/1992 | Balsells | 267/167 |
| 5,791,638 | A * | 8/1998 | Balsells | 267/167 |
| 5,794,470 | A | 8/1998 | Stringer | |
| 2002/0122690 | A1 * | 9/2002 | Poon et al. | 403/326 |
| 2003/0075394 | A1 * | 4/2003 | Shields et al. | 188/67 |
| 2008/0099968 | A1 | 5/2008 | Schroeder | |
| 2009/0160139 | A1 * | 6/2009 | Balsells | 279/142 |

FOREIGN PATENT DOCUMENTS

| | | |
|---|---|---|
| JP | 2002-361855 A | 12/2002 |
| KR | 10-1998-0059006 A | 10/1998 |

OTHER PUBLICATIONS

International Search Report completed Apr. 6, 2011 and mailed Apr. 7, 2011 from corresponding International Application No. PCT/US2010/049701, filed Sep. 21, 2010 (3 pages).
Written Opinion completed Apr. 6, 2011 and mailed Apr. 7, 2011 from corresponding International Application No. PCT/US2010/049701, filed Sep. 21, 2010 (6 pages).

* cited by examiner

*Primary Examiner* — Christopher Schwartz
(74) *Attorney, Agent, or Firm* — Klein, O'Neill & Singh, LLP

(57) ABSTRACT

A canted coil spring includes a first section having a plurality of first canted coils generally canted at an acute first angle relative to a first direction of a centerline extending through the first canted coils, and at least a second section coupled to the first section and having a plurality of second canted coils generally canted at an acute second angle relative to a second direction of the centerline extending through the second canted coils. The second direction is opposite to the first direction when the centerline is in a linear configuration. A method of manufacturing the canted coil includes fabricating a first wire section in a canted helical configuration thereby forming the plurality of first coils, and fabricating at least a second wire section in a canted helical configuration thereby forming the plurality of second coils. The first wire section is coupled to the second wire section.

22 Claims, 6 Drawing Sheets

SECTION A-A

SECTION B-B

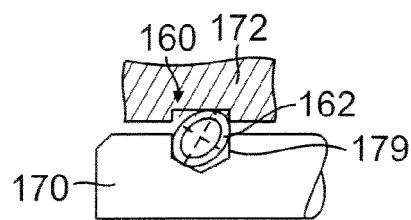
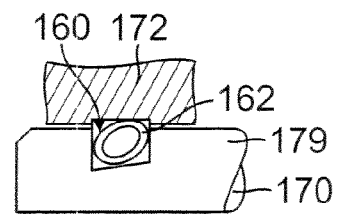
FIG. 19a          FIG. 19b
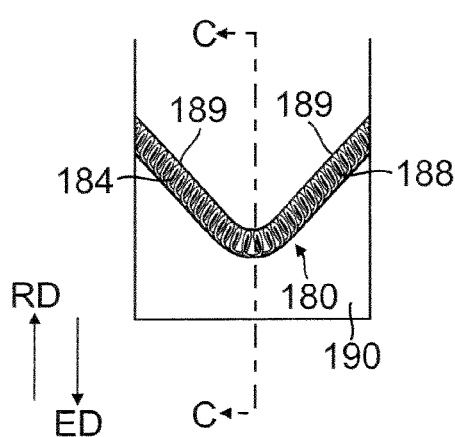
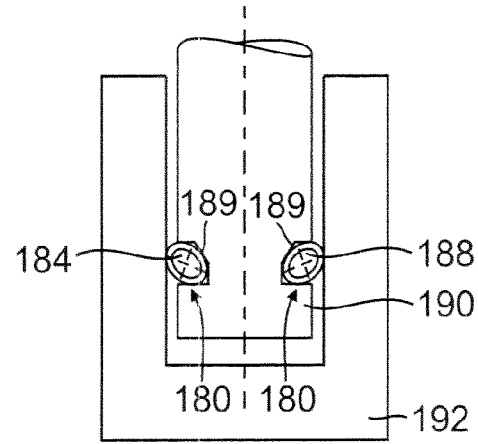
FIG. 20          FIG. 21

LONGITUDINAL CANTED COIL SPRING CONTACTS TO FACILITATE ASSEMBLY

CROSS-REFERENCED TO RELATED APPLICATION

The present application claims the benefit of the filing date of Provisional Application Ser. No. 61/244,403, filed Sep. 21, 2009, the contents of which are expressly incorporated herein by reference.

FIELD OF ART

The present application generally relates to canted coil springs, and more particularly, to methods, apparatus, and systems related to longitudinal canted coil spring contacts to facilitate assembly.

BACKGROUND

Canted coil springs can be used to, among other things, achieve consistent contact between components. Due to the deflective or slanted properties of canted coil springs, reliable contact with near constant contact force can be maintained with tolerance variations between contacting parts and surface unevenness. A canted coil spring may be wrapped around an object such as a piston or rectangular member, placed in housing grooves, or attached to components in order to facilitate mechanical or electrical contact with other parts. When the object is viewed along its cross section, a length of the spring on one side of the object has coils that are canted in an opposite direction as coils on the other side of the object. As a result, when the object is inserted into a receiving object along the length of the spring such that longitudinal spring contact occurs between the coils and the receiving object, the opposite cant in the coils can cause interference and/or resistance, which may result in the inability for insertion or a higher force on the coils along one side of the object compared to the opposing side. Accordingly, the insertion can be difficult, cumbersome, and/or cause misalignment due to the uneven forces exerted on the spring, which may cause a turn or a twist in the objects. An example a conventional canted coil spring that is wrapped around an object and used for a longitudinal spring contact with sliding insertion can be found in FIGS. 8A and 8B of Patent Application Publication No. US 2009/0160139, the contents of which are expressly incorporated herein by reference for all purposes.

SUMMARY

A canted coil spring according to aspects of the disclosure includes a first section comprising a plurality of first canted coils generally canted at an acute first angle relative to a first direction of a centerline extending through the first canted coils, and at least a second section coupled to the first section and comprising a plurality of second canted coils generally canted at an acute second angle relative to a second direction of the centerline extending through the second canted coils, the second direction being opposite to the first direction when the centerline is in a linear configuration.

According to one aspect of the disclosure, the canted coil spring comprises at least an additional section having a plurality of additional canted coils generally canted at an acute angle relative to the first direction or the second direction.

According to one aspect of the disclosure, the first section is welded to the second section.

According to one aspect of the disclosure, the first section and the second section are spaced apart along the centerline, and the canted coil spring comprises a section disposed between the first section and the second section without coils canted in the first angle or the second angle.

According to one aspect of the disclosure, the first section and the second section are connected by at least one straight wire extending along the centerline.

According to one aspect of the disclosure, the first section and the second section form a continuous one-piece section.

A canted coil spring system according to aspects of the disclosure includes an object having a first side and a second side opposite to the first side and a canted coil spring. The canted coil spring comprises a first section a plurality of first canted coils generally canted at an acute first angle relative to a first direction of a centerline extending through the first canted coils, and at least a second section comprising a plurality of second canted coils comprising coils generally canted at an acute second angle relative to a second direction of the centerline extending through the second canted coils, the second direction being opposite to the first direction when the centerline is in a linear configuration. When the canted coil spring is mounted around the object such that at least a portion of the first section extends along the first side of the object and at least a portion of the second section extends along the second side of the object, the coils in the portion of the first section and the coils in the portion of the second section are canted in generally the same direction.

According to one aspect of the disclosure, the object includes a groove configured to receive at least a portion of the canted coil spring.

According to one aspect of the disclosure, the groove longitudinally extends around the object in a V-shaped configuration.

According to one aspect of the disclosure, the groove longitudinally extends around the object in a slanted configuration.

According to one aspect of the disclosure, the groove has one of a rectangular, a V-shaped, a tapered, or a dove-tailed cross-sectional shape.

According to one aspect of the disclosure, a width of the groove is greater than or less than a width of the coils of the first section or the second section.

According to one aspect of the disclosure, an end of the first section of the canted coil spring is connected to an end of the second section of the canted coil spring to mount the canted coil spring on the object.

According to one aspect of the disclosure, when the canted coil spring is mounted on the object, the at least one additional section extends along a side of the object different from the first side and the second side.

A method of manufacturing a canted coil spring according to aspects of the disclosure includes fabricating a first wire section in a canted helical configuration thereby forming a plurality of first coils canted at an acute first angle relative to a first direction of a centerline extending through the first coils, and fabricating at least a second wire section in a canted helical configuration thereby forming a plurality of second coils canted at an acute angle relative to a second direction of the centerline extending through the second coils, the second direction being opposite to the first direction when the centerline is in a linear configuration. The first wire section is coupled to the second wire section.

According to one aspect of the disclosure, the method includes fabricating the first wire section and the second wire section from a single wire such that the first section and the second section are continuous one-piece portions of a single wire.

According to one aspect of the disclosure, the method includes fabricating at least one additional wire section in a canted helical configuration thereby forming a plurality of additional coils canted at an acute angle relative to the first direction or the second direction of the centerline extending through the additional coils.

According to one aspect of the disclosure, the method includes welding the first section to the second section.

DESCRIPTION OF DRAWINGS

These and other features and advantages of the present assemblies and methods will become appreciated as the same become better understood with reference to the specification, claims and appended drawings briefly described below.

FIG. 19a is a side cross-sectional view of a canted coil spring provided according to an exemplary embodiment shown mounted in a V-shaped groove of a shank, where the shank is being inserted into a housing.

FIG. 19b is a side cross-sectional view of a canted coil spring provided according to an exemplary embodiment shown mounted in a tapered-bottom groove of a shank, where the shank is being inserted into a housing.

FIG. 20 is a side cross-sectional view of a canted coil spring provided according to an exemplary embodiment shown mounted in a groove that longitudinally extends on the shank in a V-shaped configuration.

FIG. 21 is a cross-sectional view or FIG. 21 taken along section C-C of FIG. 20, where a housing in which the shank is inserted is also shown.

DETAILED DESCRIPTION

The detailed description set forth below in connection with the appended drawings is intended as a description of embodiments of a canted coil spring, a canted coil spring system, and methods for making the same and is not intended to represent the only forms in which the present assemblies and methods may be constructed or used. The description sets forth the features and the steps for using and constructing the canted coil springs, the canted coil spring systems, and methods in connection with the illustrated embodiments. It is to be understood, however, that the same or equivalent functions and structures may be accomplished by different embodiments that are also intended to be encompassed within the spirit and scope of the assemblies and methods. As denoted elsewhere herein, like element numbers are intended to indicate like or similar elements or features.

Figure 1:
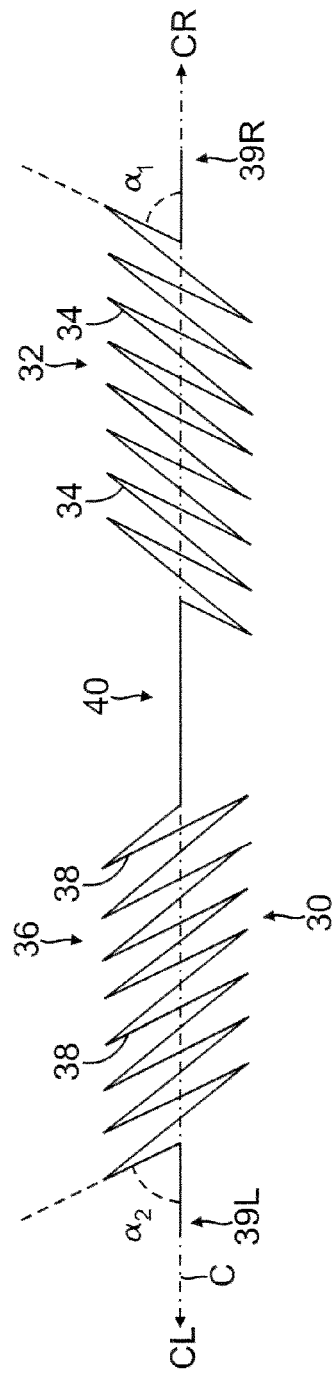
FIG. 1 is a schematic diagram of a canted coil spring provided according to one exemplary embodiment.

A canted coil spring 30 according to one exemplary embodiment is shown in FIG. 1. The canted coil spring 30 includes a first section 32 having a plurality of coils 34 and a second section 36 having a plurality of coils 38. A centerline C extends through the coils 34 of the first section 32 and coils 38 of the second section 36. The coils 34 of the first section 32 are canted at a first acute angle $\alpha 1$ relative to a direction CR of the centerline C. The coils 38 of the second section 36 are canted at a second acute angle $\alpha 2$ relative to a direction CL of the centerline C that is opposite to the direction CR. Accordingly, the coils 34 of the first section 32 are canted toward the direction CR, while the coils 38 of the second section 36 are canted toward the direction CL. Thus, the coils 34 and 38 are canted in opposite directions. The angles $\alpha 1$ and $\alpha 2$ may be the same or different. In the embodiment of FIG. 1, the angles $\alpha 1$ and $\alpha 2$ are shown to be the same. The first section 32 and the second section 36 are connected at a transition area 40.

Figure 3:
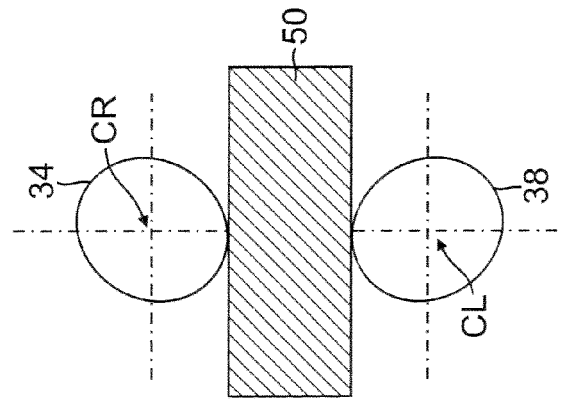
FIG. 3 is a cross-sectional view of FIG. 2 taken along section 3-3 of FIG. 2.
Figure 2:
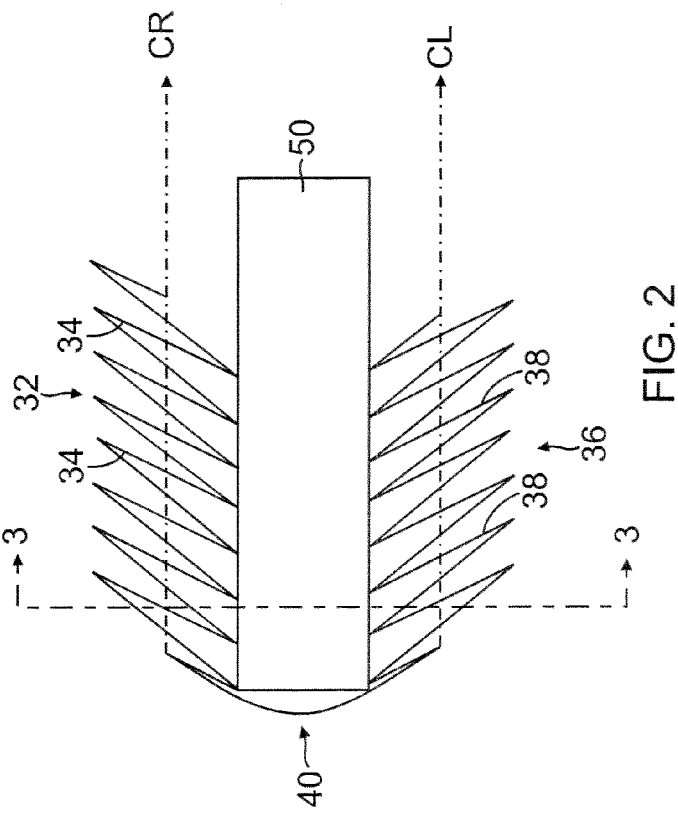
FIG. 2 is a schematic diagram of the canted coil spring of FIG. 1 shown wrapped around an object.
Figure 4:
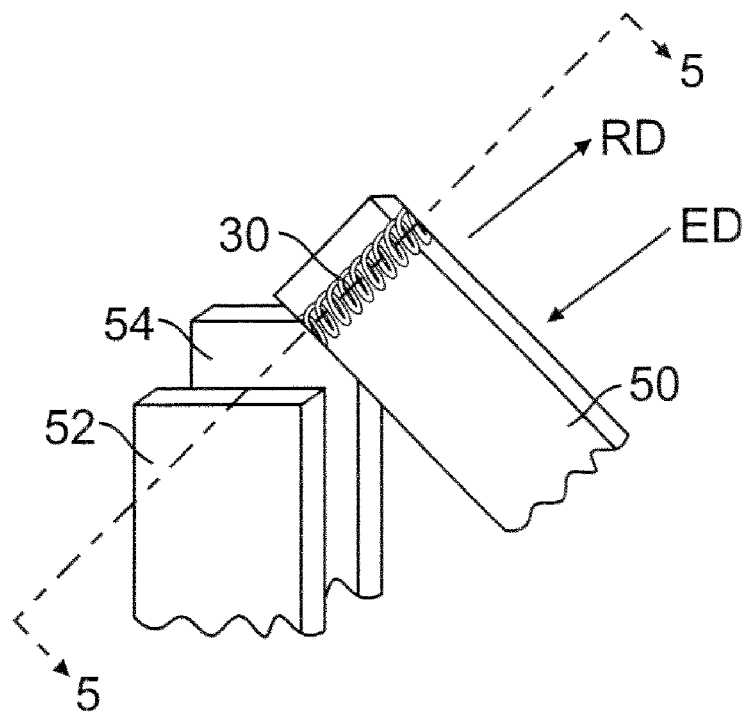
FIG. 4 is a partial perspective view of the spring of FIG. 1 wrapped around an exemplary shank and being inserted into an exemplary housing.
Figure 5:
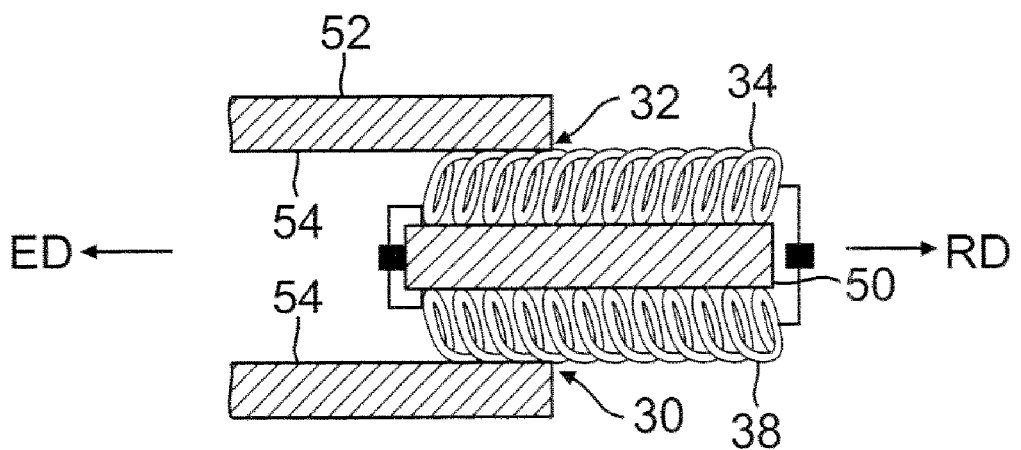
FIG. 5 is a cross sectional view of the shank of FIG. 4 taken along section 5-5 of FIG. 4 during insertion of the shank into the housing.

Referring to FIGS. 2 and 3, when the canted coil spring 30 is wrapped around an object 50, which may be a shank and referred to herein as the shank 50, the coils 34 and 38 are canted generally in the same direction because the directions CR and CL of the centerline C are no longer opposite to each other. Referring now to FIGS. 4 and 5, when the shank 50 is inserted in an entry direction ED into another object 52, which may be a housing for receiving the shank 50 and may be referred to herein as the housing 52, the spring 30 makes sliding contact along its length, which may be referred to herein as longitudinal sliding contact, with the inner walls 54 of the housing 52. As shown in FIG. 5, the coils 34 of the first section 32 and the coils 38 of the second section 36 are canted opposite to the entry direction ED of the object 50. Accordingly, since the angles $\alpha 1$ and $\alpha 2$ of the spring 30 are the same in this embodiment, a resistance created by the longitudinal sliding contact between the first section 32 and the corresponding inner wall 54 of the housing 52 is similar to and in the same direction as the resistance created by the longitudinal sliding contact between the second section 34 and the corresponding inner wall 54 of the housing 52. Because the first section 32 and the second section 36 are opposite to each other relative to the entry direction ED or a removal direction RD, any misalignment and/or twisting in the shank 50 that may be caused during insertion into the housing 52 or removal of the shank 50 from the housing 52 is reduced. Furthermore, because both the coils 34 and 38 are canted away from the entry direction ED and are canted toward the removal direction RD, insertion of the shank 50 inside the housing 52 creates less resistance compared to withdrawal of the shank 50 from the housing 52. Therefore, the effort or force required to insert the shank 50 into the housing 52 is less than the effort or force required to withdraw the shank 50 from the housing 52, which may be a preferred feature for certain applications of the spring 30. As understood from the foregoing, the reduced insertion force compared to withdrawal force is provided by canting the coils of the spring on both side of the shank along the same direction.

Referring again to the exemplary embodiment of the spring 30 shown in FIG. 1, the transition area 40 includes a straight wire, which is a continuous one-piece part with the first section 32 and the second section 36. Accordingly, the first section 32, the transition area 40 and the second section 36 are fabricated in one piece from the same wire. The straight wire in the transition area 40 may be used in applications where absence of a spring force is preferred along a particular portion of the spring. Furthermore, as shown in FIG. 2, the straight wire allows the spring 30 to be wrapped around the shank 50 such that the straight wire is positioned at an end of the shank 50 where either no contact with the housing 52 occurs or a presence of a spring force is not preferred. However, one of ordinary skill in the art will readily recognize that the transition area 40 can be fabricated having any shape, dimensions, and material(s) so as to provide a particular function to the spring 30. For example, the transition area 40 can be as minimal as possible such that an end coil 34 of the first section 32 directly connects with an end coil 38 of the second section 36. The transition area 40 may be a canted coil spring having different characteristics than the first section 32 and/or the second section 36. Furthermore, the transition area 40 may be a regular spring, another type of elastic structure such as an elastomeric part, or any other structure having any shape, dimensions and/or material(s) that can provide a preferred function. The transition area 40 can also be separately formed and subsequently attached to the two spring sections 32, 36.

Figure 6:
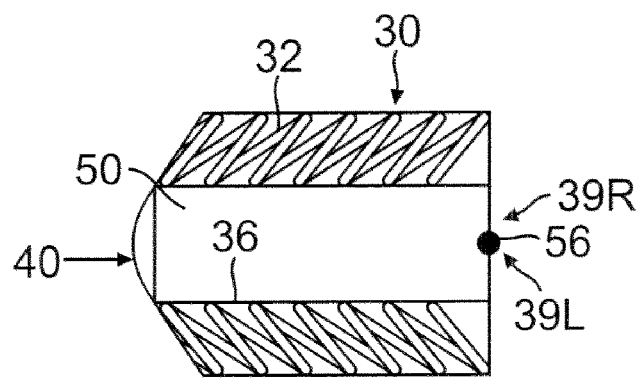
FIG. 6 is a cross-sectional view of a spring according to embodiment of FIG. 1 shown wrapped around a shank, where the ends of the spring are shown to be welded together.

Referring back to FIG. 1 and to FIG. 6, in one exemplary embodiment, when the spring 30 is wrapped around the shank 50, the ends 39R and 39L of the spring 30 can be connected in order to secure and/or maintain the spring 30 on the shank 50. The ends 39R and 39L can be connected by devices and methods that are known to those of ordinary skill in the art. For example, the ends 39R and 39L of the spring 30 can be welded together, which is shown in FIG. 6 with a weld bead 56. The ends 39R and 39L can also be connected together with fasteners or similar devices (not shown) so as to allow the ends to be disconnected when necessary and connected back together. In other embodiments, the spring 30 is installed in the housing and not on the shank with at least two different sections of the spring located on two different sides of an axis canted in the same direction.

Figure 7:
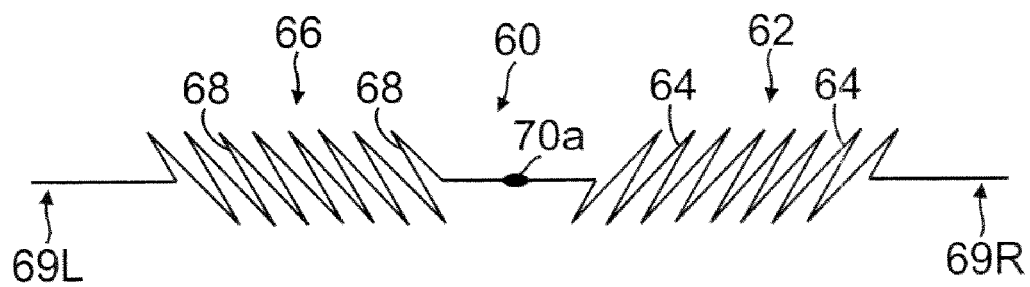
FIG. 7 is a schematic diagram of a canted coil spring provided according to one exemplary embodiment.
Figure 8:
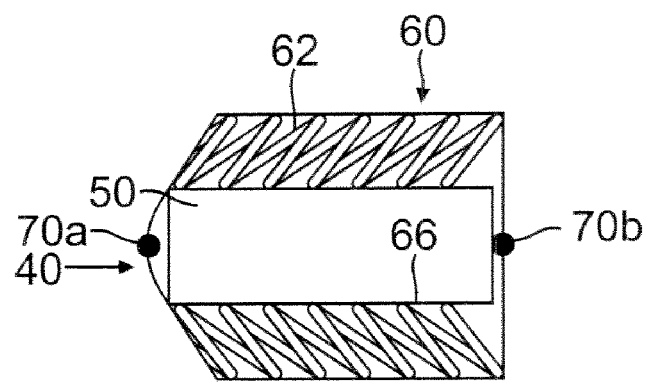
FIG. 8 is a cross-sectional view of the spring of FIG. 7 shown wrapped around a shank, where the ends of the spring are shown to be welded together.

Referring to FIGS. 7 and 8, a spring 60 according to another exemplary embodiment includes a first section 62 with coils 64 and at least a second section 66 with coils 68. The first section 62 and the second section 66 are separate canted coil springs that are joined at the transition area 40 by welding as shown by a weld bead 70a. However, the first section 62 and the second section 66 can be connected by any method other than welding, such as by using fastening device or means for joining. Referring to FIG. 8, when the spring 70 is wrapped around the shank 50, the ends 69R and 69L of the spring 70 can be connected in order to secure and/or maintain the spring 30 on the shank 50. The ends 69R and 69L can be connected by devices and methods that are known to those of ordinary skill in the art. For example, the ends 69R and 69L of the spring 70 can be welded together, which is shown in FIG. 8 with a weld bead 70b. The ends 69R and 69L can also be connected together with fasteners or similar devices (not shown) so as to allow the ends to be disconnected when necessary.

Figure 9:
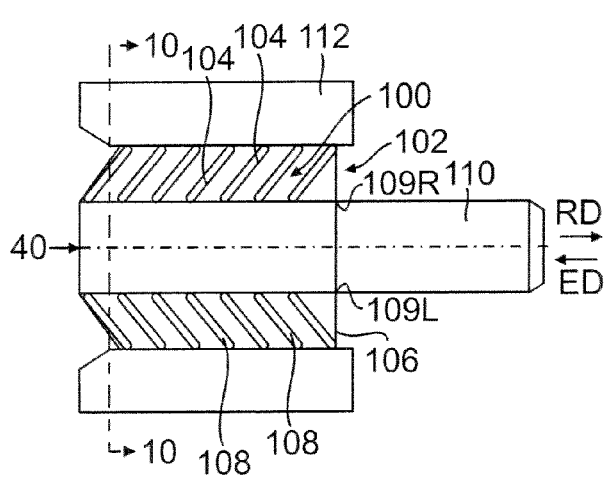
FIG. 9 is a side cross-sectional view of a canted coil spring provided according to an exemplary embodiment shown mounted around a shank, where the shank is being inserted into a housing.
Figure 10:
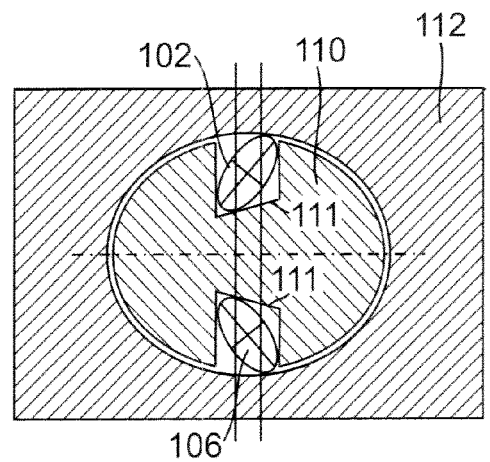
FIG. 10 is a cross-sectional view of the spring, shank and housing of FIG. 9 taken at section 10-10 of FIG. 9.
Figure 11:
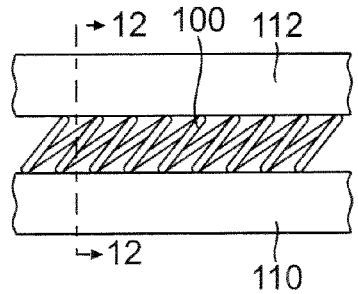
FIG. 11 is a side cross-sectional view of another canted coil spring provided according to an exemplary embodiment shown mounted around a shank, where the shank is being inserted into a housing.
Figure 12:
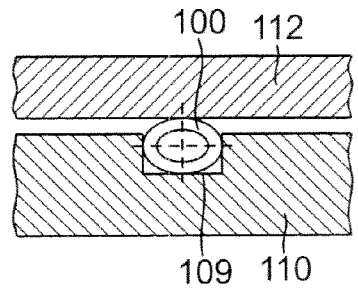
FIG. 12 is a cross-sectional view of the spring, shank and housing of FIG. 11 taken at section 12-12 of FIG. 11.

In one exemplary embodiment shown in FIGS. 9 and 10, a spring 100 having a first section 102 with coils 104 and a second section 106 with coils 108 is received in grooves 111 of a shank 110. Similar to the spring 30 of FIG. 1, the coils 104 and 108 are generally canted in the same direction when positioned around a shank 110 as shown. For connection with a housing 112, the shank 110 can be inserted into the housing 112, during which the spring and the coils 104 and 108 make longitudinal sliding contact with the housing 112. The grooves 111 can align or assist in aligning the spring 100 with the entry direction ED and removal direction RD. Due to the presence of the grooves 111, the first section 102 may only be connected to the second section 106 at the transition area 40. Accordingly, the end 109R of the first section 102 and the end 109L of the second section 106 may not be connected. Furthermore, each groove 111 can be independent such as to have closed ends. Accordingly, the first section 102 and the second section 106 may not be connected at all and be separate since the sections 102 and 104 will be restricted from any movement within their respective grooves 111. For example, the grooves can embody a dove-tail configuration for retaining the two spring sections within their respective grooves. Although the grooves 111 are shown and described herein to be in the shank 110, the grooves 111 may alternatively be in the housing 112. In another embodiment, both the shank 110 and the housing 112 may have grooves, where each groove receives at least a portion of the spring 100. In FIG. 10, the grooves 111 are shown with generally straight or parallel sidewalls and with a canted or sloped bottom wall located between the sidewalls. However, the grooves 111 can have any cross-sectional shape in order to provide a preferred function for the spring 100. For example, referring to FIGS. 11 and 12, the grooves 111 may have a dove-tail cross sectional shape (shown in FIG. 12) in order to retain the spring therein after the spring 100 is mounted in the grooves 111. In other embodiments, the groove is a flat bottom groove.

Figure 13:
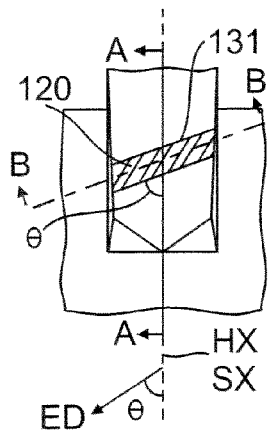
FIG. 13 is a side cross-sectional view of another canted coil spring provided according to an exemplary embodiment shown mounted around a shank, where the shank is being inserted into a housing.
Figure 14:
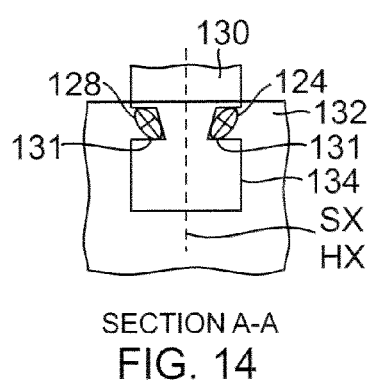
FIG. 14 is a cross-sectional view of the spring, shank and housing of FIG. 13 taken at section A-A of FIG. 13.
Figure 15:
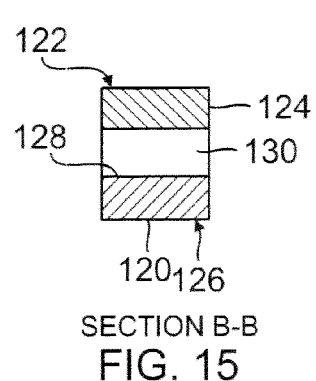
FIG. 15 is a cross-sectional view of the spring, shank and housing of FIG. 13 taken at section B-B of FIG. 13.

In one exemplary embodiment shown in FIGS. 13-15, a spring 120 having a first section 122 with coils 124 and a second section 126 with coils 128 is wrapped around a shank 130 in a slanted configuration relative to the axis of the shank SX. The entry direction ED of the shank 130 is at an angle relative to the inner walls 134 of the housing 132. In other words, the entry direction ED is oriented at a slant angle θ relative to the central axis HX of the housing 132. Accordingly, by also orienting the grooves 131 at the same angle θ relative to the axis of the shank SX, the spring 120 and hence the coils 124 and 128 of the first section and second section 122 and 126, respectively, are longitudinally aligned with the entry direction ED.

Figure 16:
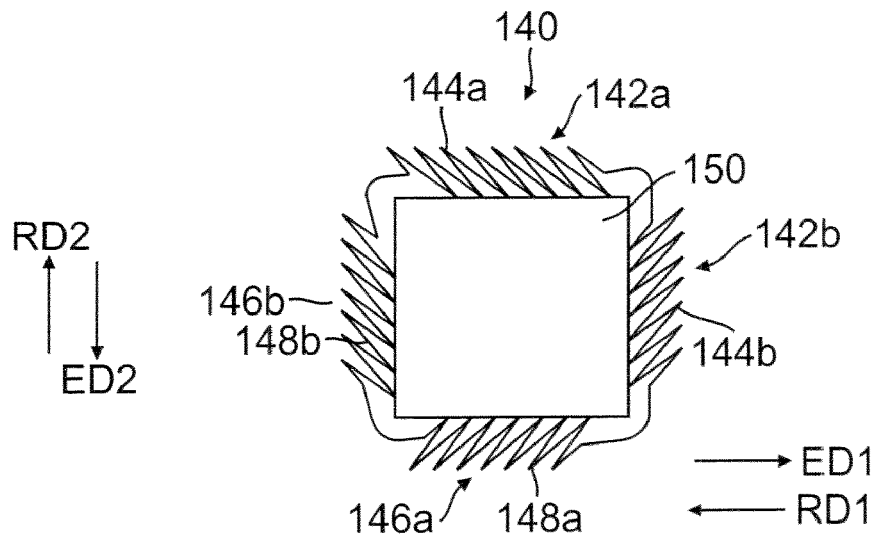
FIG. 16 is a schematic diagram of a canted coil spring provided according to an exemplary embodiment.

In one exemplary embodiment shown in FIG. 16, a spring 140 includes four sections 142a, 142b, 146a and 146b. The spring 140 is wrapped around a shank 150 with a square cross section, which can be inserted into a housing (not shown) in two different entry and removal directions ED1, RD1 and ED2, RD2. Accordingly, when the spring 140 is unwrapped from the shank 150 and linearly oriented, the coils 144a of section 142a and the coils 148a of section 146a are canted opposite to each other, and the coils 144b of section 142b and the coils 148b of section 146b are canted opposite to each other. Thus, when the spring 140 is wrapped around the shank 150, the coils 144a and 148a are canted in the same direction, and the coils 144b and 148b are canted in the same direction. Although the shank 150 is shown in FIG. 16 to have a rectangular or square cross-sectional shape, the shank can have any shape, such as oval, hexagonal, rounded rectangular or other geometrical shape. Accordingly, a spring according to the disclosure can be fabricated with any number of sections for use with such a shank. One of ordinary skill in the art will readily recognize from the above exemplary embodiments that the spring 140 can have any number of segments with the coils in each segment being angled opposite to or the same as adjacent or other segments in the spring in order to provide a preferred function for the spring or allow the use of the spring with an object having any shape or size.

Figure 17:
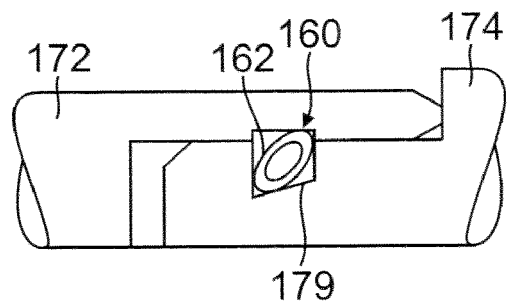
FIG. 17 is a side cross-sectional view of a canted coil spring provided according to an exemplary embodiment shown mounted around a shank, where the shank is being inserted into a housing.
Figure 18A:
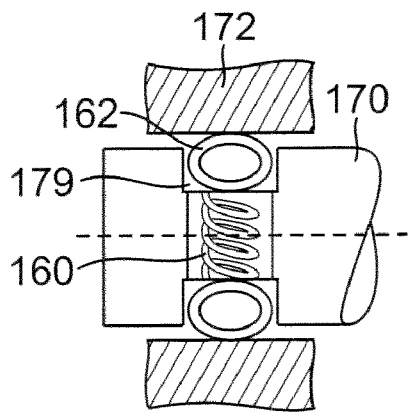
FIG. 18a is a side cross-sectional view of a canted coil spring provided according to an exemplary embodiment shown mounted in a groove of a shank that is wider than the spring coils, where the shank is being inserted into a housing.
Figure 18B:
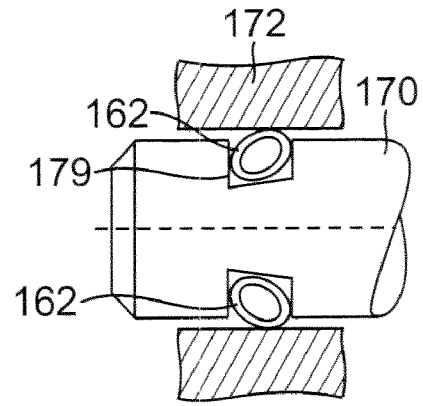
FIG. 18b is a side cross-sectional view of a canted coil spring provided according to an exemplary embodiment shown mounted in a groove of a shank that is narrower than the spring coils, where the shank is being inserted into a housing.

Referring to FIGS. 17-19b, various exemplary grooves 179 in a shank 170 for receiving a canted coil spring 160 provided according to the exemplary embodiments are shown. In FIG. 17, the shank 170 is latched into a cavity of a housing 172 by a canted coil spring 160 provided according to one exemplary embodiment. The shank 170 has a flange 174 that is butted against the housing 172 upon insertion for controlling the depth of insertion into the housing. In FIG. 18a, the canted coil spring 170 is located in a square groove having a groove width that is wider than the major axis of the spring. The spring can be a radial spring. In FIG. 18b, the canted coil spring 160 is located in a tapered bottom groove. The groove has a groove width that is less than the major axis of the spring. The spring can be an axial canted coil spring or a radial canted coil spring. In FIG. 19a, the groove 179 has a V-shaped bottom, while in FIG. 19b, the groove has an inclined or a tapered bottom. Also shown in FIGS. 19a and 19b are housing grooves. Thus, the spring grooves shown in FIGS. 19a and 19b are formed from both the shank and the housing. These grooves in FIGS. 19a and 19b are preferably used for latching or locking applications.

Referring to FIGS. 20 and 21, a shaft 190 having a rectangular or square cross section is shown with a groove 189 that extends around the shaft 190 in a V-shaped configuration and is configured to receive a spring 180 according to one exemplary embodiment. The V-shaped configuration of the groove 189 reduces the angle of contact between the inner surface 194 of the housing 192 and the coils 184 and 188 of the spring 180 during insertion of the shank 190 in the housing 192, and increases the angle of contact between the inner surface 194 and the coils 184 and 188 during removal of the object 190. Accordingly, compared to an object having a radial groove and using the same spring as the spring 180, the object of FIGS. 20-21 requires a lower force for insertion in the housing 192 and a higher force for removal from the housing 192.

Exemplary methods of fabricating a canted coil spring will now be described with reference to FIGS. 1 and 7. A canted coil spring, such as the exemplary spring 30 of FIG. 1 can be fabricated by methods that are known to those of ordinary skill in the art, except that the coils 34 of the first section 32 and the coils 38 of the second section 36 are fabricated to have coil angles that are canted in opposite directions. The transition area 40 can be fabricated to have any shape or length in order to provide a preferred function. In the exemplary embodiment of FIG. 1, the transition area 40 includes a straight wire. According to another exemplary embodiment shown in FIG. 7, the first section 62 and the second section 66 are fabricated separately and then connected together to form the spring 60 by, for example, welding or other methods. Based on the foregoing, one of ordinary skill in the art will readily recognize that a canted coil spring with a plurality of sections, as shown in the exemplary embodiment of FIG. 16, having coils with different cant angles can be fabricated as a one-piece continuous spring having the plurality of sections or as spring sections fabricated separately and then connected together.

Although limited embodiments of canted coil springs, canted coil spring systems, and method of fabricating the canted coil springs have been specifically described and illustrated herein, many modifications and variations will be apparent to those skilled in the art. Accordingly, it is to be understood that the canted coil springs, the canted coil spring systems, and methods of fabricating these springs according to principles described herein may be embodied other than as specifically described herein. The canted coil springs, the canted coil spring systems, and methods of fabricating these springs are also defined in the following claims.

What is claimed is:

1. A canted coil spring system comprising:
   an object having a first side and a second side opposite to the first side;
   a canted coil spring comprising:
      a first wire section comprising a plurality of first canted coils generally canted at an acute first angle relative to a first direction of a centerline extending through the first canted coils; and
      a second wire section connected to the first wire section, said second wire section comprising a plurality of second canted coils comprising coils generally canted at an acute second angle relative to a second direction of the centerline extending through the second canted coils, the second direction being opposite to the first direction when the centerline is in a linear configuration; and
   wherein when the canted coil spring is mounted around the object such that at least a portion of the first wire section extends along the first side of the object and at least a portion of the second wire section extends along the second side of the object, the coils in the portion of the first wire section and the coils in the portion of the second wire section are canted in generally the same direction.

2. The canted coil spring system of claim 1, wherein the object includes a groove configured to receive at least a portion of the canted coil spring.

3. The canted coil spring system of claim 2, wherein the groove longitudinally extends around the object in a V-shaped configuration.

4. The canted coil spring system of claim 2, wherein the groove longitudinally extends around the object in a slanted configuration.

5. The canted coil spring system of claim 2, wherein the groove has one of a rectangular, a V-shaped, a tapered, or a dove-tailed cross-sectional shape.

6. The canted coil spring system of claim 2, wherein a width of the groove is greater than or less than a width of the coils of the first wire section or the second wire section.

7. The canted coil spring system of claim 1, wherein the canted coil spring comprises at least one additional section comprising an additional plurality of canted coils generally canted at an acute angle relative to the first direction or the second direction.

8. The canted coil spring system of claim 7, wherein when the canted coil spring is mounted on the object, the at least one additional section extends along a side of the object different from the first side and the second side.

9. The canted coil spring system of claim 1, wherein an end of the first wire section of the canted coil spring is connected to an end of the second wire section of the canted coil spring to mount the canted coil spring on the object.

10. A method of manufacturing a canted coil spring, the method comprising:
fabricating a first wire section in a canted helical configuration thereby forming a plurality of first coils canted at an acute first angle relative to a first direction of a centerline extending through the plurality of first coils;
fabricating at least a second wire section in a canted helical configuration thereby forming a plurality of second coils canted at an acute angle relative to a second direction of the centerline extending through the plurality of second coils, the second direction being opposite to the first direction when the centerline is in a linear configuration;
providing a transition section in between the first wire section and the second wire section, the transition section being sized with a sufficient length to wrap around a shank so that the first wire section and the second wire section are disposed on opposite side of a centerline of the shank; and
wherein the first wire section is coupled to the second wire section through the transition section.

11. The method of claim 10, wherein the first wire section and the second wire section are continuous one-piece portions of a single wire.

12. The method of claim 10, comprising fabricating at least one additional wire section in a canted helical configuration thereby forming a plurality of additional coils canted at an acute angle relative to the first direction or the second direction of the centerline extending through the additional coils.

13. The method of claim 10, wherein the first section is welded to the second section.

14. The method of claim 10, wherein the first section and the second section are spaced apart along the centerline.

15. A canted coil spring comprising:
a first wire section comprising a plurality of first canted coils generally canted at an acute first angle relative to a first direction of a centerline extending through the first canted coils; and
a second wire section comprising a plurality of second canted coils generally canted at an acute second angle relative to a second direction of the centerline extending through the second canted coils;
a transition section, which separates an end coil of the first wire section and an end coil of the second wire section by a length, said transition section comprising a configuration that differs from the first wire section and the second wire section;
a first wire position in which the centerline is linear and the first direction being opposite the second direction; and
a second wire position in which the centerline has a bend and the first direction or the second direction rotated to be similar.

16. The canted coil spring of claim 15, further comprising a shank comprising a centerline and wherein the transition section crosses the centerline.

17. The canted coil spring of claim 16, wherein the shank, the first wire section and the second wire section are disposed in a channel of a housing and wherein the plurality of first canted coils and the plurality of second canted coils are canted by the housing in the second wire position.

18. The canted coil spring of claim 15, comprising at least an additional section comprising a plurality of additional canted coils generally canted at an acute angle relative to the first direction or the second direction.

19. The canted coil spring of claim 15, wherein the transition section comprises a weld bead.

20. The canted coil spring of claim 15, wherein the transition section being sized and shaped to permit the first wire section and the second wire section to wrap around a shank so that the first wire section and the second wire section are disposed on opposite side of a centerline of the shank.

21. The canted coil spring of claim 15, further comprising a second transition section.

22. The canted coil spring of claim 15, wherein the first wire section, the second wire section, and the transition section form a continuous one-piece section.

* * * * *